Aug. 5, 1958
G. F. HETZEL
2,845,809
PRE-LOADED GEAR
Filed Feb. 17, 1955
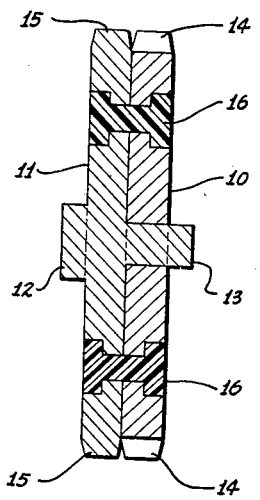
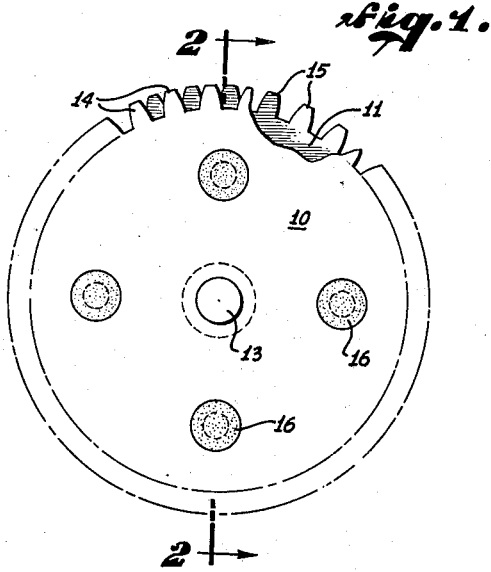
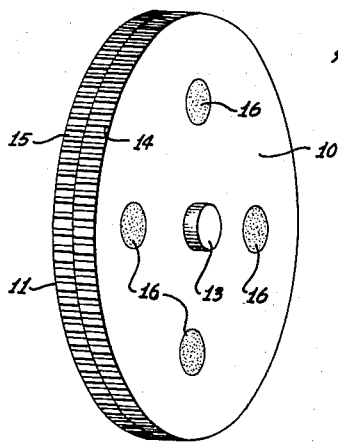
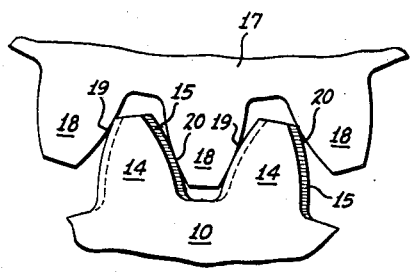
George J. Hetzel,
INVENTOR.
HUEBNER, BEEHLER,
WORREL & HERZIG,
ATTORNEYS.

United States Patent Office 2,845,809
Patented Aug. 5, 1958

2,845,809
PRE-LOADED GEAR

George F. Hetzel, San Diego, Calif., assignor to The Regents of The University of California, Berkeley, Calif., a corporation of California Application February 17, 1955, Serial No. 488,787

2 Claims. (Cl. 74—440)

The present invention relates to an improved gear, and particularly to a type of pre-loaded gear wherein backlash is avoided.

Pre-loaded gears composed of two sections with displaced gear teeth are known in the art. The displacement of the teeth and the preloading thereof is usually accomplished in these known gears by the use of compression or extension springs acting on the two sections. The uniformity of the springs, their loading and the degree of tooth displacement between the two sections is very difficult to control. The assembly of the two gear sections and the springs under compression or extension to uniformly preload the gears to the desired extent poses a very difficult assembly and control problem making the gears relatively costly for a mass production item. Furthermore, these spring pre-loaded gears are generally restricted to wide spaced gearing, whereas anti-back-lash gearing of narrow spacing is often demanded in applications such as in instrumentation.

Accordingly, it is an important object of the present invention to provide pre-loaded gearing which is readily assembled and mass produced under controlled conditions at low cost.

Another object is to provide pre-loaded gearing that can be positively and uniformly pre-loaded to the desired extent, and requires a minimum of space and gear thickness.

Additional objects will become apparent from the following description.

Broadly stated, the present invention consists of a preloaded gear comprising two gear sections held together by elastic transverse members such as pins or rivets. The teeth of the two gear sections are normally held in predetermined displaced relationship with each other by the transverse members. These members, by reason of their elasticity, also serve to pre-load the gear and to prevent back-lash in gearing. The teeth in one section of the pre-loaded gear are caused to bear against one face of the gear teeth of a meshed gear, and the displaced teeth in the other gear section are made to bear against the other face of the teeth of the meshed gear. The tooth pressure of the teeth in the two sections of the pre-loaded gear is determined by the degree of tooth displacement between the two sections and the elastic properties of the transverse members.

A more detailed description of a specific embodiment of my invention is given with reference to the drawing, wherein:

Figure 1 is a side elevational view of an assembled gear, with a portion of one section broken away, showing a displacement of the teeth of the two sections;

Figure 2 is a cross-sectional view taken on the line 2—2 of Figure 1 and showing transverse members in the form of elastic rivets holding the two gear sections together;

Figure 3 is a perspective view of the gear assembly showing the displaced relationship of the gear teeth of each section; and Figure 4 is a fragmentary detail side view showing teeth of the preloaded gear assembly in engagement with the teeth of a meshed gear.

The preloaded gear assembly of the illustrated specific embodiment of my invention is composed of two gear sections 10 and 11 of the same diameter, pitch and face. One of the sections 11 is fixed to a shaft 12 while the other section 13 is centrally apertured and fitted over the hub 13, also fixed to the section 11. The two sections 10 and 11 are held together by elastic rivets 16, cast in counterbored holes formed in each section, as best shown in Figure 2, so that teeth 14 and 15 on sections 10 and 11, respectively, are held spaced a predetermined distance with respect to each other.

The counterbored rivet holes occupied by rivets 16 are oriented in each section 10 and 11 so that when the axes of the holes in one section are coaxial with the axes of the holes in the other section, that is, when the holes match, the teeth of one section will be displaced with respect to the teeth of the other section a desired, predetermined distance. This displacement distance is determined by the degree of pre-loading desired and the elastic properties of the rivets. In general, the pre-load should be determined so that it is greater than the transmitted tooth load while the gear assembly is in service.

Rivets 16 are made of elastic or resilient materials such as synthetic resins, plastics, and elastomers or rubbers having a high degree of resilience or elasticity. Examples of these materials are furan resins and plastics, phenol-formaldehyde resins and plastics, epoxy resins and plastics, alkyd resins and plastics, polyester resins and plastics, methacrylate polymers, butadiene-acrylonitrile copolymers, butadiene-styrene copolymers, polychloroprenes, alkylene polysulfides, isobutylene-diolefin copolymers, and compounded rubbers, elastomers, resins and plastics.

When the pre-loaded gear is meshed with a second gear 17, Figure 4, the teeth 18 of the second gear are engaged under pressure at their rearward faces 19 by the teeth 14 of the section 10 of the pre-loaded gear, and at their forward faces 20 by the teeth 15 of the pre-loaded gear section 11. Thus the teeth 18 of gear 17 are engaged under pressure at both faces, and there is no clearance between the tooth profiles of gear 17 and the pre-loaded gear. Consequently, there is no back-lash and substantially no lost motion when the gears are reversed.

Although the illustrated specific embodiment described above is shown to have four rivets 16, it will be understood that any number of rivets of any sizes, structure or arrangement in the pre-loaded gear can be used as desired. Also, the rivet heads need not be countersunk in the sides of the gear sections. The resilience or elasticity in the rivets counteracting the tendency to deform or shear them supplies the pre-loading to the assembled gear in actual use in engagement with a meshed gear.

These rivets are readily molded or cast directly into the gear assembly and permit the production of a compact, thin gear assembly in which the gear teeth are positively and uniformly loaded to the desired, predetermined degree. The gear sections 10 and 11 are readily assembled, rivets 16 are readily cast in the resulting assembly and the pre-loaded gear of my invention is readily mass-produced under controlled conditions at low costs.

By virtue of the compactness of the assembled pre-loaded gear of the invention, it finds ready use in instrumentation such as in gun-sight computing machines, tuning gear trains of radio, television, radar and other electronic equipment, such as servo mechanisms, for example, and in reversing recorders and timing mechanisms. In general, the pre-loaded gears of the invention find ready application in any mechanisms where the backlash of ordinary gears is a problem or an undesirable feature.

The foregoing description is explanatory only, and is given primarily to illustrate a specific embodiment of my invention. It is understood that many variations in the structure, design and details of the pre-loaded gear described above will occur to one skilled in the art. Accordingly, it is understood that such changes and modifications in the structure, design and details of the specific embodiment illustrated and described above may be made within the scope of the appended claims without departing from the spirit of the invention.

What I claim is:

1. A pre-loaded gear assembly comprising a first flat gear having a central hub on one face thereof, a second flat gear journalled on said hub in face-abutting relation to said first gear, aligned openings extending completely through said gears and generally parallel to the axis of said gears outwardly of said hub, a body of elastically deformable material filling said aligned openings, said body of material serving to yieldably hold said gears in predetermined angular relationship with their teeth out of axial alignment and having enlargements on opposite sides of said assembly serving as the sole means holding said gears in face-to-face relation.

2. A gear assembly as defined in claim 1 wherein said enlargements are seated in enlarged portions of said openings and are flush with the outer faces of said gears.

References Cited in the file of this patent

UNITED STATES PATENTS

| | | |
|---|---|---|
| 1,240,126 | Dubois | Sept. 11, 1917 |
| 1,435,571 | Wright | Nov. 14, 1922 |
| 2,310,232 | Hale | Feb. 9, 1943 |
| 2,683,380 | Hutton | July 13, 1954 |

FOREIGN PATENTS

| | | |
|---|---|---|
| 345,462 | Great Britain | Mar. 26, 1931 |
| 560,469 | Great Britain | Apr. 5, 1944 |